United States Patent
Ida et al.

(10) Patent No.: US 7,801,297 B2
(45) Date of Patent: Sep. 21, 2010

(54) COMMUNICATION DEVICE AND COMMUNICATION CONTROL METHOD

(75) Inventors: Takehiro Ida, Yokosuka (JP); Mitsuo Iwanaga, Yokohama (JP); Yasushi Sakamoto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1243 days.

(21) Appl. No.: 10/986,802

(22) Filed: Nov. 15, 2004

(65) Prior Publication Data

US 2005/0111658 A1 May 26, 2005

(30) Foreign Application Priority Data

Nov. 20, 2003 (JP) .............................. 2003-390426

(51) Int. Cl.
*H04K 1/00* (2006.01)
(52) U.S. Cl. .............................. 380/28; 380/35; 380/36; 380/247
(58) Field of Classification Search .................. 380/28, 380/35–36, 274
See application file for complete search history.

(56) References Cited

U.S. PATENT DOCUMENTS

| | | | | |
|---|---|---|---|---|
| 5,613,005 | A * | 3/1997 | Murakami et al. ............ | 380/28 |
| 6,373,951 | B1 * | 4/2002 | Jenkins et al. ............... | 380/262 |
| 6,560,338 | B1 * | 5/2003 | Rose et al. .................... | 380/47 |
| 6,944,299 | B1 * | 9/2005 | Mallela et al. ............... | 380/262 |
| 7,095,856 | B2 * | 8/2006 | Logalbo et al. ............. | 380/274 |
| 2003/0014680 | A1 * | 1/2003 | Zielbauer ..................... | 713/400 |
| 2006/0233361 | A1 * | 10/2006 | Hasegawa et al. ............ | 380/42 |

FOREIGN PATENT DOCUMENTS

| | | |
|---|---|---|
| JP | 5-316011 | 11/1993 |
| JP | 6-237248 | 8/1994 |
| JP | 6-350595 | 12/1994 |
| JP | 2002-530021 | 9/2002 |
| JP | 2003-52076 | 2/2003 |
| JP | 2003-534746 | 11/2003 |
| WO | WO 2004086672 A1 * | 10/2004 |

OTHER PUBLICATIONS

AIPN Machine Translation of International Japanese Patent W0 2004/086672 A1.*
AIPN Machine Translation of Japanese Patent No. P2003-534746A.*
3GPP TS 33.102 V3.13.0, Sections 6.6.3 and 6.6.4.
3GPP TS 25.331 V3.13.0, Sections 8.2 and 8.6.4.3.

* cited by examiner

*Primary Examiner*—Kambiz Zand
*Assistant Examiner*—Amare Tabor
(74) *Attorney, Agent, or Firm*—Oblon, Spivak, McClelland, Maier & Neustadt, L.L.P.

(57) ABSTRACT

A communication device comprises a receiver configured to receive a notification of a cipher parameter used for encryption of data and a requested start time at which the encryption starts; and a correction unit configured to determine whether the cipher parameter needs to be corrected in response to the notification having been retransmitted based on the requested start time and an actual start time at which the encryption actually starts, and correct the cipher parameter.

12 Claims, 6 Drawing Sheets

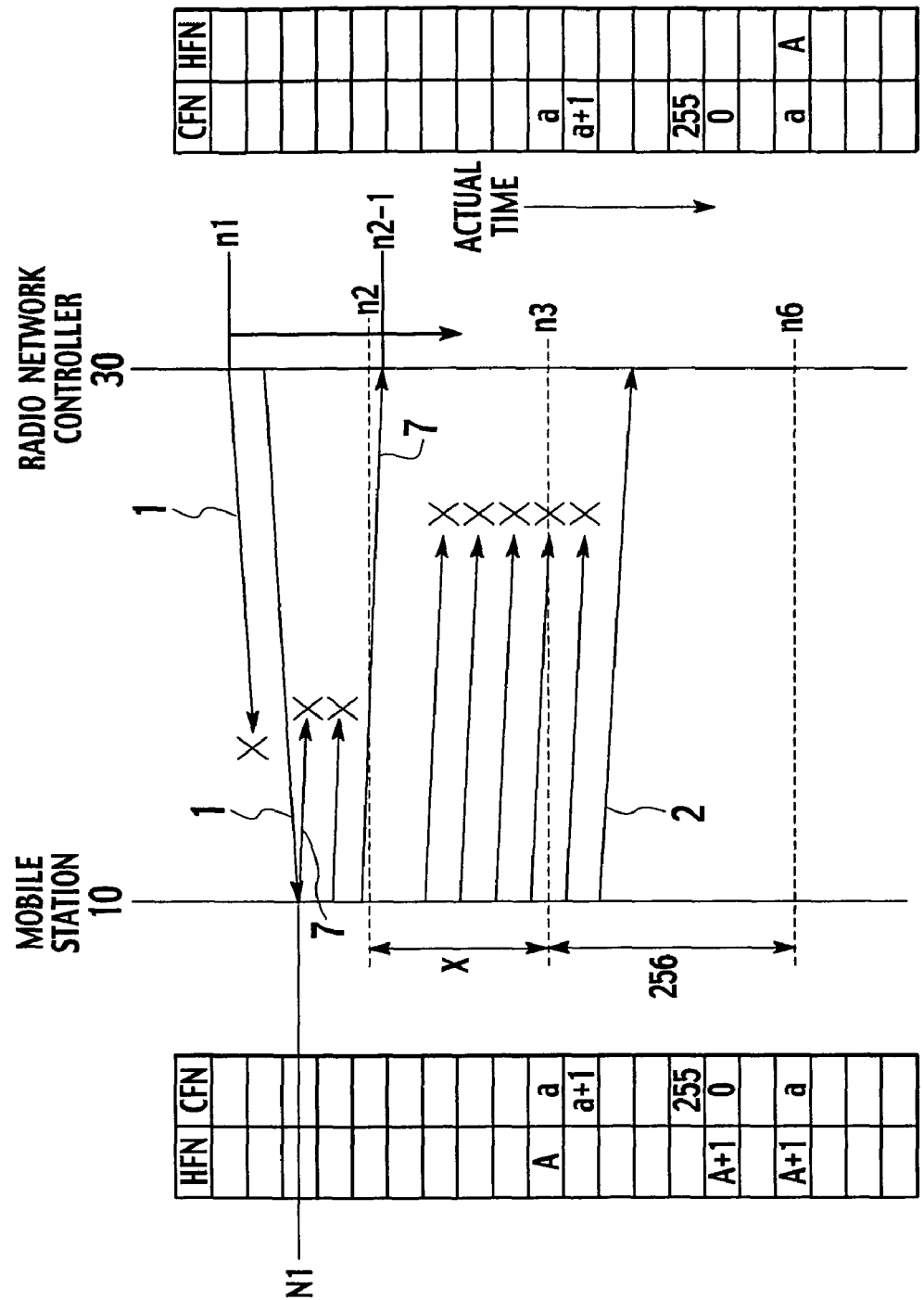

COMMUNICATION DEVICE AND COMMUNICATION CONTROL METHOD

CROSS REFERENCE TO RELATED APPLICATIONS

This application is based upon and claims the benefit of priority from the prior Japanese Patent Application No. P2003-390426, filed on Nov. 20, 2003; the entire contents of which are incorporated herein by reference.

BACKGROUND OF THE INVENTION

1. Field of the Invention

The present invention relates to a communication device and a communication control method.

2. Related Background Art

Typically, since control data and user data are transferred via radio bearer in mobile communication systems, a cipher process such as transmitting encrypted data such as encrypted control data and user data and then decrypting on the reception side is carried out. The cipher process prepares multiple key seeds for generation of keys to be used for encryption and decryption, and partially changes the key seed for each frame, thereby improving confidentiality. Parameters to be used for encryption such as key seeds and part thereof are called cipher parameters.

According to International Mobile Telecommunications-2000 (IMT-2000), since a key is changed for each frame when encrypting and decrypting transparent data, the frame number for each frame is used as a seed for generation of a key (e.g., see '6.6.3 Ciphering method, 6.6.4 Input parameters to the cipher algorithm', 3GPP TS 33.102 V3.13.0, December, 2002.)

In addition, when newly starting a cipher process or when modifying and restarting the cipher process, a requested start time for starting the cipher process and a part of key seeds to be used after that requested start time are notified with a message (e.g., see '8.2 Radio Bearer control procedures, 8.6.4.3 RB information to setup', 3GPP TS 25.331 V3.13.0, December, 2002).

The hyper frame number (HFN), which forms the upper bits of the frame number, is partially used for part of the key seeds. The requested start time is specified using a connection frame number (CFN), which forms the lower bits of the frame number. The CFN is incremented by '1' per 10 milliseconds from an initial value of '0', and is reset to '0' when having reached '255', which forms a CFN cycle. In other words, the CFN provides a cyclic timing of 256 frames (8 bits). The HFN is incremented by '2' per CFN cycle.

When transmission of a message for notification of a part of the key seeds and a requested start time fails, that message is then retransmitted. As a result, the requested start time for a message transmitter may differ from a start time recognized by a message receiver based on that message. The HFN is incremented by '2' per CFN cycle. Therefore, the start time difference between the transmitter and the receiver may lead to difference in key seeds therebetween, making it impossible to normally carry out the cipher process.

More specifically, as shown in FIG. 1, a radio network controller 230 transmits to a mobile station 210 a request message (RADIO BEARER SETUP) 201 to request the mobile station 210 to set a cipher parameter and a requested start time. The mobile station 210 sets 'A' to HFN as the cipher parameter, and 'a' to CFN as the requested start time. The mobile station 210 transmits to the radio network controller 230 a response message (RADIO BEARER SETUP COMPLETE) 202 including part of the set HFN and the requested start time.

In this manner, the mobile station 210 and the radio network controller 230 carry out an initial process before starting the cipher process. The requested start time 'a' for the mobile station 210 equals an actual time 'n1'. The actual time means a one-way increasing actual time other than a cyclic time such as the CFN.

If transmission of a response message fails, the mobile station 210 then retransmits a response message a predetermined number of times. If multiple retransmissions are made taking a long time, the radio network controller 230 may receive a response message after the actual time 'n1'. A single CFN cycle is 256 frames. Therefore, the radio network controller 230 erroneously recognizes that the requested start time 'a' represented by the CFN included in the message is an actual time 'n2', which is a single CFN cycle after the actual time 'n1'.

As a result, since a single CFN cycle from 'n1' has elapsed, the mobile station 210 sets a one-incremented value of 'A+1' to the HFN at the time 'n2'. On the other hand, the radio network controller 230 sets to the HFN, 'A' generated from a part of the HFN notified with the response message. Accordingly, at the time 'n2', the mobile station 210 and the radio network controller 230 start the cipher process using different cipher parameters.

As a result, the mobile station 210 and the radio network controller 230 cannot correctly decrypt encrypted data. Then received data results in abnormal. Such difference in cipher parameters is called ciphering shift. Such a ciphering shift may occur during a radio access link being kept between the mobile station 210 and the radio network controller 230, resulting in failure in effective data reception/transmission.

SUMMARY OF THE INVENTION

An objective of the present invention is to prevent parameters used for encryption between communication devices from differing when a notification of parameters used for the encryption and a requested start time at which the encryption starts is retransmitted multiple times, therefore preventing erroneous data.

A communication device of an embodiment of the present invention includes a receiver configured to receive a notification of a parameter used for encryption of data (hereafter, referred to as 'cipher parameter') and a start time at which the encryption starts (hereafter, referred to as 'requested start time'); and a correction unit configured to determine whether the cipher parameter needs to be corrected in response to the notification having been retransmitted based on the requested start time and a start time at which the encryption actually starts (hereafter, referred to as 'actual start time'), and to correct the cipher parameter.

According to such a communication device, when it is determined that the received cipher parameters need to be corrected due to the difference between the requested start time and the actual start time that develops after the notification has been retransmitted multiple times, thereby taking a long time, the cipher parameters can be corrected based on the relationship between the requested start time and the actual start time. This allows prevention of cipher parameters from differing between the communication devices, even in the case where a notification has been retransmitted multiple times resulting in the difference between the requested start time and the actual start time. Therefore, erroneous data can be prevented.

A communication device of another embodiment of the present invention includes a receiver configured to receive a notification of a cipher parameter used for encryption of data and a requested start time at which the encryption starts; and a discard unit configured to determine whether a retransmitted notification needs to be discarded based on a time at which the receiver has received the notification (hereafter, referred to as 'reception time') and the requested start time, and to discard the notification.

According to such a communication device, a notification can successfully arrive after the requested start time due to multiple retransmissions thereof. And if the communication device, which has received the notification, operates according to the notified requested start time and the parameter, the actual start time differs from the requested start time. To solve this problem, notification needing to be discarded can be discarded. In other words, a notification that causes the cipher parameters to differ between the communication devices can be discarded and disabled. This allows prevention of cipher parameters used for the encryption from differing between the communication devices due to a notification having been retransmitted multiple times. Therefore, erroneous data can be prevented.

A communication device of another embodiment of the present invention includes a transmitter configured to transmit a notification of a cipher parameter used for encryption of data and a requested start time at which the encryption starts, and retransmit the notification when transmission of the notification fails; and a retransmission controller configured to control the transmitter to retransmit the notification based on the retransmission time of the notification and the requested start time.

According to such a communication device, even if a notification is retransmitted at the retransmission time after the notification has been retransmitted multiple times, thereby taking a long time, since the communication device successfully receives the retransmitted notification after the requested start time, the difference between the requested start time and the actual start time develops when the communication device that has received the notification operates according to the notified cipher parameters and the requested start time.0 To solve this problem, retransmission of the notification causing cipher parameter difference between the communication devices to develop is stopped and disabled. This allows prevention of the cipher parameters used for the encryption from differing between the communication devices due to a notification having been retransmitted multiple times, thereby preventing erroneous data.

A communication control method of an embodiment of the present invention includes receiving a notification of a cipher parameter used for encryption of data and a requested start time at which the encryption starts; determining whether the cipher parameter needs to be corrected in response to the notification having been retransmitted based on the requested start time and an actual start time at which the encryption actually starts, and correcting the cipher parameter.

A communication control method of another embodiment of the present invention includes receiving a notification of a cipher parameter used for encryption of data and a requested start time at which the encryption starts; determining whether the notification needs to be discarded in response to the notification having been retransmitted based on a reception time at which the receiver has received the notification and the requested start time; and discarding the notification.

A communication control method of another embodiment of the present invention includes controlling retransmission of a notification of a cipher parameter used for the encryption of data and a requested start time at which the encryption starts based on the retransmission time of the notification and the requested start time.

BRIEF DESCRIPTION OF THE DRAWINGS

FIG. 7 shows an initial process according to the modification of the present invention (the timer is not reactivated).

DETAILED DESCRIPTION OF THE PREFERRED EMBODIMENTS (Mobile Communication System)

Figure 1:
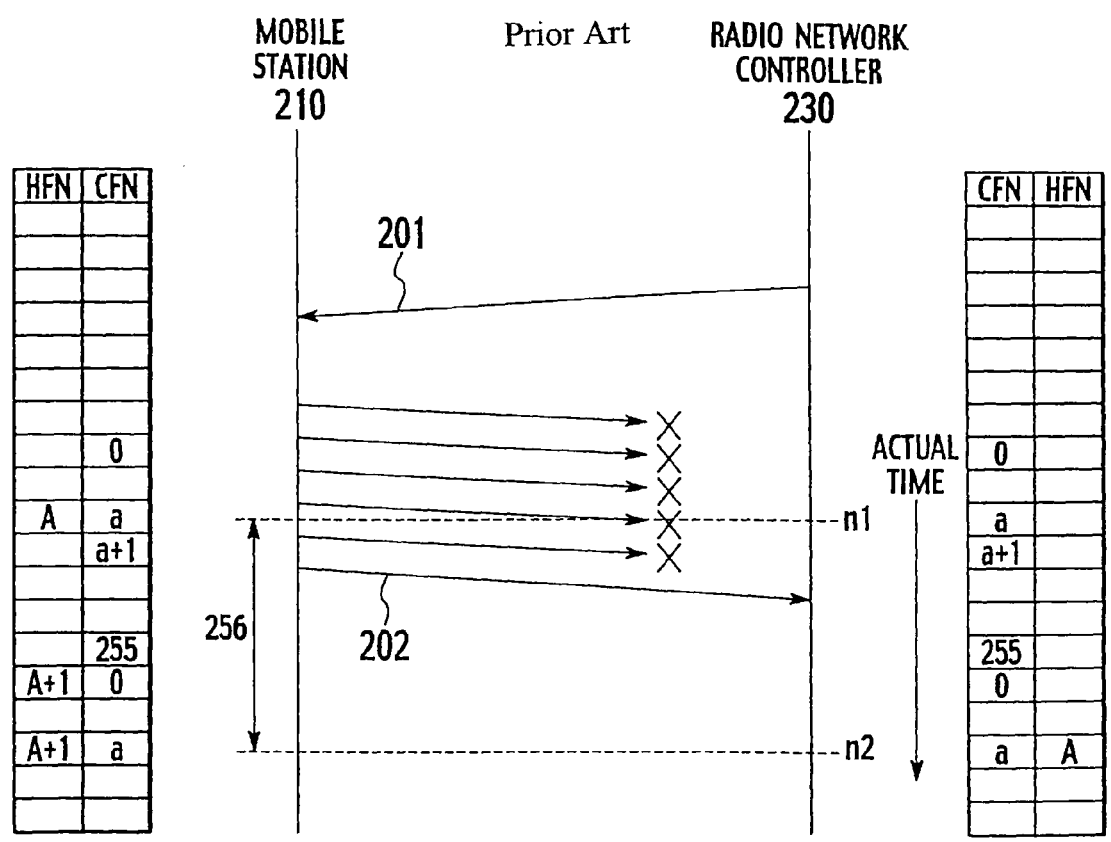
FIG. 1 shows a conventional initial process.
Figure 2:
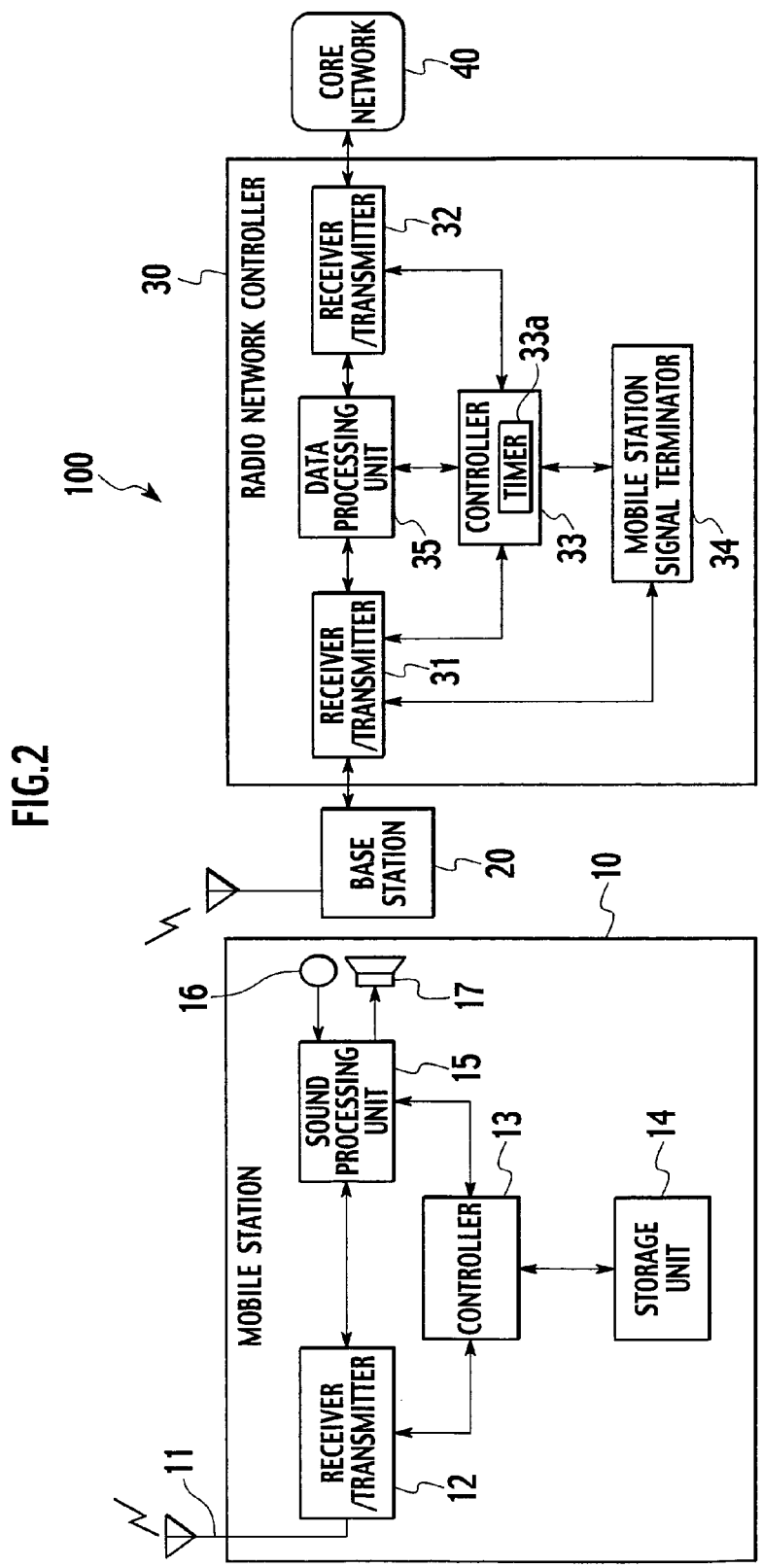
FIG. 2 shows a configuration of a mobile communication system according to an embodiment of the present invention.

As shown in FIG. 2, a mobile communication system 100 includes a mobile station 10, a base station 20, a radio network controller 30, and a core network 40. The mobile station 10 and the radio network controller 30 are communication devices which carry out a cipher process such as encrypting and transmitting data such as control data and user data, and then decrypting on a reception side. Radio communication between the mobile station 10 and the radio network controller 30 is carried out via the base station 20.

The mobile station 10 includes an antenna 11, a receiver/transmitter 12, a controller 13, a storage unit 14, a sound processing unit 15, a microphone 16, and a speaker 17.

The receiver/transmitter 12 establishes a radio link with the base station 20 via the antenna 11 and communicates therewith. The receiver/transmitter 12 then receives/transmits control data and user data from/to the radio network controller 30 via the base station 20. The receiver/transmitter 12 receives from the controller 13 control data to be transmitted to the radio network controller 30. The receiver/transmitter 12 receives from the sound processing unit 15 user data to be transmitted to the radio network controller 30. The receiver/transmitter 12 inputs to the controller 13 control data received from the radio network controller 30. The receiver/transmitter 12 inputs to the sound processing unit 15 user data received from the radio network controller 30.

The controller 13 carries out an initial process before starting a cipher process. The controller 13 instructs the sound processing unit 15 to carry out a cipher process for user data. The controller 13 carries out a cipher process for control data. The controller 13 inputs to the receiver/transmitter 12, encrypted control data to be transmitted to the radio network controller 30. The controller 13 receives from the receiver/transmitter 12, the encrypted control data transmitted from the radio network controller 30. The controller 13 carries out other processes for controlling the mobile station 10 as well as the initial process and the cipher process. The controller 13 receives and stores control information from and in the storage unit 14. The storage unit 14 stores control information.

The sound processing unit 15 is instructed by the controller 13 to carry out the cipher process. The sound processing unit 15 carries out the cipher process for user data according to the instruction from the controller 13. The sound processing unit 15 receives user sound data from the microphone 16. The microphone 16 receives user sound data from the user of the mobile station 10 and inputs it to the sound processing unit 15. The sound processing unit 15 encrypts the user data received from the microphone 16, and inputs the resulting data to the receiver/transmitter 12. In addition, the sound processing unit 15 receives from the receiver/transmitter 12 the encrypted user data transmitted from the radio network controller 30. The sound processing unit 15 decrypts the received user data, and inputs the resulting data to the speaker 17. The speaker 17 receives and outputs the user sound data transmitted from the sound processing unit 15.

The radio network controller 30 includes receiver/transmitters 31 and 32, a controller 33, a mobile station signal terminator 34, and a data processing unit 35.

The receiver/transmitter 31 communicates with the base station 20. The receiver/transmitter 31 receives/transmits control data and user data from/to the mobile station 10 via the base station 20. The receiver/transmitter 31 receives from the mobile station signal terminator 34 control data to be transmitted to the mobile station 10. The receiver/transmitter 31 receives from the data processing unit 35 user data to be transmitted to the mobile station 10. The receiver/transmitter 31 inputs the received control data to the mobile station signal terminator 34. The receiver/transmitter 31 inputs the received user data to the data processing unit 35.

The receiver/transmitter 32 receives/transmits control data and user data from/to the core network 40. The receiver/transmitter 32 receives from the controller 33 control data to be transmitted to the core network 40. The receiver/transmitter 32 receives from the data processing unit 35 user data to be transmitted to the core network 40. The receiver/transmitter 32 inputs to the controller 33 the control data received from the core network 40. The receiver/transmitter 32 inputs to the data processing unit 35 user data received from the core network 40.

The controller 33 carries out an initial process before starting a cipher process. The controller 33 instructs the mobile station signal terminator 34 to carry out a cipher process for control data. The controller 33 instructs the data processing unit 35 to carry out a cipher process for user data. The controller 33 controls the base station 20 via the receiver/transmitter 31. For example, the controller 33 instructs the base station 20 to establish a radio link with the mobile station 10.

The controller 33 receives from the receiver/transmitter 32 the control data transmitted from the core network 40. The controller 33 inputs to the mobile station signal terminator 34 control data to be transmitted to the mobile station 10. The controller 33 receives from the mobile station signal terminator 34 the control data transmitted from the mobile station 10. The controller 33 inputs to the receiver/transmitter 32 control data to be transmitted to the core network 40. The controller 33 has a timer 33a for measuring time.

The mobile station signal terminator 34 is instructed by the controller 33 to carry out a cipher process. The mobile station signal terminator 34 carries out the cipher process for control data according to the instruction from the controller 33. The mobile station signal terminator 34 receives control data from the controller 33. The mobile station signal terminator 34 encrypts the control data received from the controller 33, and inputs the resulting data to the receiver/transmitter 31. The mobile station signal terminator 34 receives from the receiver/transmitter 31 encrypted control data transmitted from the mobile station 20. The mobile station signal terminator 34 decrypts the received control data, and inputs the resulting data to the controller 33.

The data processing unit 35 is instructed by the controller 33 to carry out a cipher process. The data processing unit 35 carries out the cipher process for user data according to the instruction from the controller 33. The data processing unit 35 receives user data from the receiver/transmitter 32. The data processing unit 35 encrypts the user data received from the receiver/transmitter 32, and inputs the resulting data to the receiver/transmitter 31. The data processing unit 35 receives from the receiver/transmitter 31 the encrypted user data transmitted from the mobile station 10. The data processing unit 35 decrypts the received user data, and inputs the resulting data to the receiver/transmitter 32.

Figure 3:
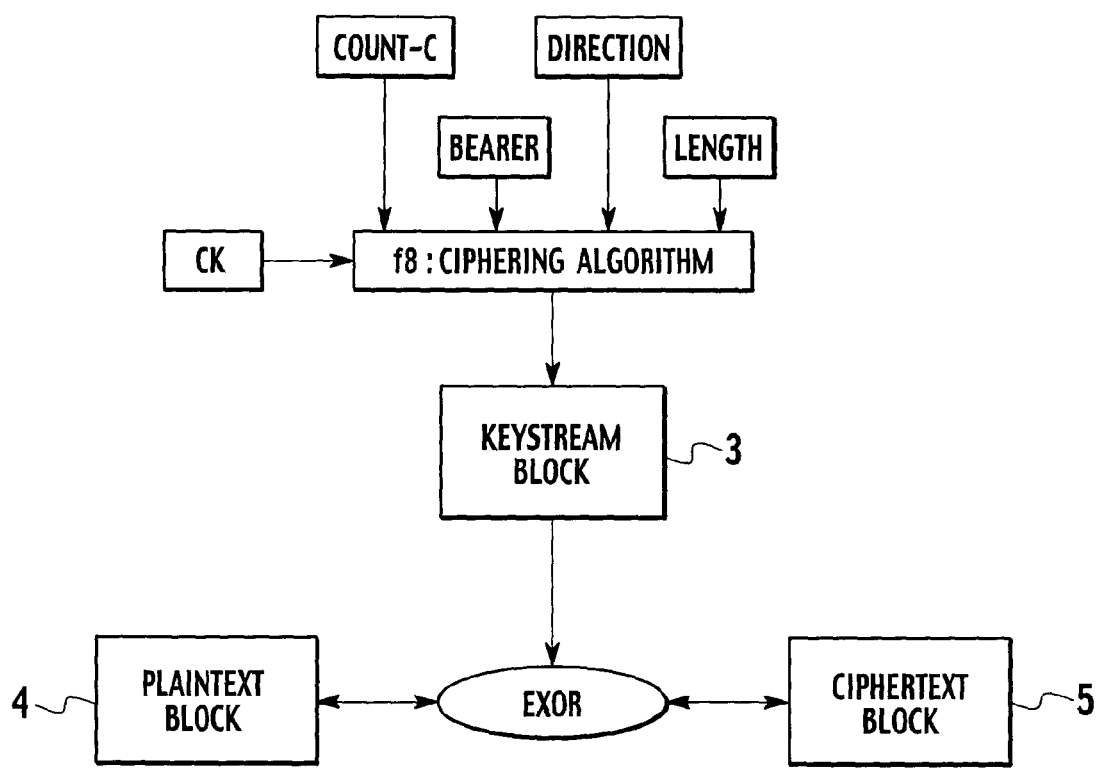
FIG. 3 shows a cipher process according to the embodiment of the present invention.

The cipher process and the initial process thereof carried out by the mobile station 10 and the radio network controller 30 are described forthwith in detail. The controller 13 and the sound processing unit 15 in the mobile station 10 and the mobile station signal terminator 34 and the data processing unit 35 in the radio network controller 30 carry out the cipher process for data such as control data and user data as shown in FIG. 3. The controller 13, the sound processing unit 15, the mobile station signal terminator 34, and the data processing unit 35 use a frame number called 'COUNT-C' as a key seed for encryption and decryption.

The controller 13, the sound processing unit 15, the mobile station signal terminator 34, and the data processing unit 35 generate a KEY STREAM BLOCK 3 through inputting to a ciphering algorithm f8, a key seed such as the frame number 'COUNT-C', a logic channel identifier 'BEARER', a data transmission/reception direction 'DIRECTION', the bit length of a target encrypted and decrypted 'LENGTH', and a cipher key 'CK' used for encryption and decryption.

When encrypting, the controller 13, the sound processing unit 15, the mobile station signal terminator 34, and the data processing unit 35 encrypt a PLAIN TEXT BLOCK 4, i.e., generate a CIPHER TEXT BLOCK 5 from the PLAIN TEXT BLOCK 4, through calculating exclusive-OR (EXOR) of the generated KEY STREAM BLOCK 3 and the PLAIN TEXT BLOCK 4.

When decrypting, the controller 13, the sound processing unit 15, the mobile station signal terminator 34, and the data processing unit 35 decrypt the CIPHER TEXT BLOCK 5, i.e., generate the PLAIN TEXT BLOCK 4 from the CIPHER TEXT BLOCK 5, through calculating exclusive-OR (EXOR) of the generated KEY STREAM BLOCK 3 and the CIPHER TEXT BLOCK 5.

Figure 4:
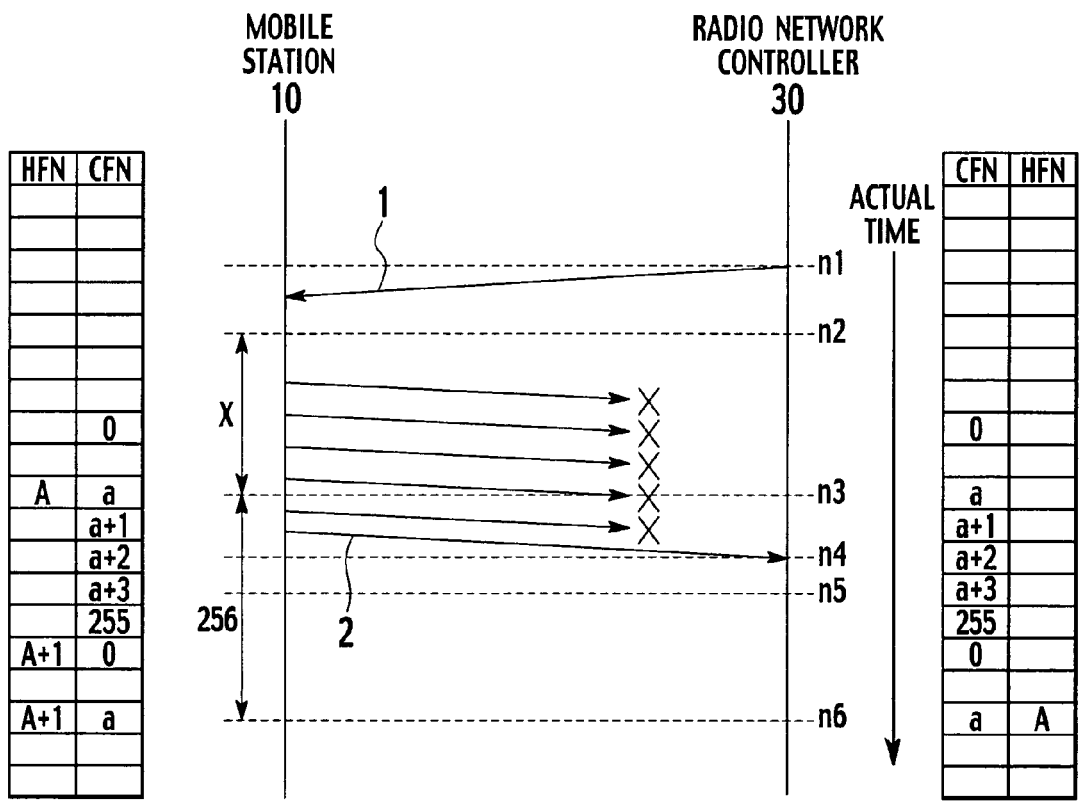
FIG. 4 shows an initial process according to the embodiment of the present invention.

When newly starting the above cipher process or when modifying and restarting the cipher process, the controller 13 in the mobile station 10 and the controller 33 in the radio network controller 30 carry out an initial process shown in FIG. 4. FIG. 4 shows only apart of CFN and HFN needed for description. To begin with, the radio network controller 30 transmits to the mobile station 10 a request message (RADIO BEARER SETUP) 1 for requesting the mobile station 10 to set a cipher parameter and a requested start time.

More specifically, the controller 33 generates and inputs a request message to the mobile station signal terminator 34. The mobile station signal terminator 34 inputs the request message received from the controller 33 to the receiver/transmitter 31. The receiver/transmitter 31 then transmits the request message received from the mobile station signal terminator 34 to the mobile station 10 via the base station 20.

The mobile station 10 receives that request message (RADIO BEARER SETUP) 1. The mobile station 10 sets a cipher parameter and a requested start time. A part of the HFN, which forms the upper bits of the frame number (COUNT-C) is used as the cipher parameter, i.e., part of a key seed. The requested start time is specified using CFN, which forms the lower bits of the frame number (COUNT-C).

Figure 5:
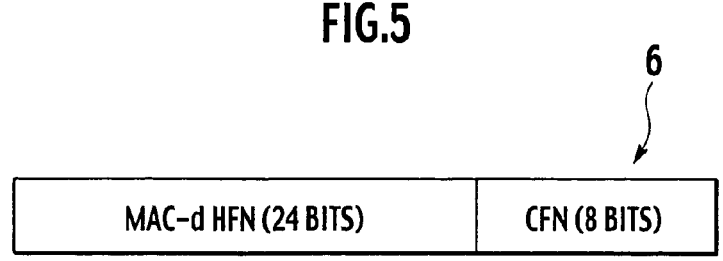
FIG. 5 shows a frame number according to the embodiment of the present invention.

More specifically, as shown in FIG. 5, the frame number (COUNT-C) 6 includes HFN of 24 bits, which becomes a message authentication code-d (MAC-d), and CFN of 8 bits. The mobile station 10 sets the upper 20 bits of HFN, and also sets '0' to all the lower 4 bits thereof. The mobile station 10 then transmits to the radio network controller 30 a response message (RADIO BEARER SETUP COMPLETE) 2 including the upper 20 bits of HFN, which form part of the set HFN, and a requested start time, thereby notifying the set cipher parameter and the requested start time. In short, such a response message is the notification of the cipher parameter and the requested start time.

More specifically, the receiver/transmitter 12 receives and inputs a request message to the controller 13. Upon reception of the request message, the controller 13 sets a cipher parameter and a requested start time. The controller 13 generates and inputs a response message including setting information to the receiver/transmitter 12. The receiver/transmitter 12 transmits the response message received from the controller 13 to the radio network controller 30 via the antenna 11 and the base station 20. In short, the receiver/transmitter 12 serves as a transmitter, which transmits notification of cipher parameters used for encryption of data and a requested start time for starting encryption.

The receiver/transmitter 31 in the radio network controller 30 receives a response message from the mobile station 10 via the base station 20. In short, the receiver/transmitter 31 serves as a receiver, which receives notification of cipher parameters used for encryption of data and a requested start time for starting encryption.

As described above, the communication system 100 has the mobile station 10 on the side setting cipher parameters and a requested start time, and the radio network controller 30 on the side being set the cipher parameters and the requested start time. In addition, a request message (RADIO BEARER SETUP) triggers transmission of a response message for notification of the set cipher parameters and the requested start time. Note that request messages and response messages are categorized in control data.

If transmission of a response message (notification) in the initial process fails, the mobile station 10 retransmits that response message as shown in FIG. 4. More specifically, the mobile station 10 retransmits the response message under layer 2 retransmission control. At this time, as long as the retransmission count is low, no time difference develops between the requested start time for the mobile station 10 that has transmitted the response message and the start time that the radio network controller 30, which has received that response message, recognizes based on the response message. On the other hand, in the case of retransmission being made multiple times thereby taking a long time, the requested start time for the mobile station 10 that has transmitted the response message may differ from the start time that the radio network controller 30, which has received that response message, recognizes based on the response message.

In other words, in the case of a response message being retransmitted multiple times under layer 2 retransmission control, there is fear that the receiver may erroneously recognize the requested start time for the transmitter. In order to solve the above-described problems, the mobile station 10 and the radio network controller 30 carry out an initial process using either of the first, the second, or the third communication control method described below.

(First Communication Control Method)

According to a first communication control method, the radio network controller 30, which is set cipher parameters and a requested start time, corrects the cipher parameters if necessary in response to a response message (notification) being retransmitted multiple times.

The controller 33 in the radio network controller 30 explicitly instructs a processing time to the mobile station 10 to start setting cipher parameters and a requested start time and then transmitting a response message. More specifically, the controller 33 generates and inputs a request message including the set explicit processing time to the receiver/transmitter 31. This processing time is almost equal to the transmission start time to start transmission of a response message. Therefore, instruction of a processing time is equivalent to instruction of a transmission start time.

As shown in FIG. 4, the controller 33 sets an actual time 'n2' as a processing time to a request message (RADIO BEARER SETUP) 1, and instructs the mobile station 10 to use it. In addition, the controller 33 activates the timer 33a at the set processing time 'n2' to measure elapsed time from the processing time 'n2'.

The controller 13 in the mobile station 10 sets cipher parameters and a requested start time at the processing time 'n2' specified in the request message. The controller 13 sets 'a' to the requested start time represented by CFN, and 'A' to HFN as the cipher parameter. The CFN as the requested start time 'a' for the mobile station 10 corresponds to an actual time 'n3' at which the CFN reaches 'a' for the first time after the actual processing time 'n2'.

If transmission of a response message (notification) fails, the receiver/transmitter 12 in the mobile station 10 then retransmits that response message. In the case where retransmission fails multiple times, the receiver/transmitter 31 in the radio network controller 30 may receive a retransmitted response message (RADIO BEARER SETUP COMPLETE) 2 at an actual time 'n4' after the actual time 'n3'.

The controller 33 in the radio network controller 30 receives from the mobile station signal terminator 34 a response message received by the receiver/transmitter 31. The controller 33 decides an actual time 'n6' as an actual start time at which the CFN reaches the requested start time 'a' represented by the CFN in the response message for the first time after the actual reception time 'n4'. The controller 33 then measures time from the processing time 'n2' to the actual start time 'n6' using the timer 33a activated at the processing time 'n2'.

Upon reception of a response message (notification) by the receiver/transmitter 31, the controller 33 calculates the difference between the requested start time and the actual start time (hereafter, referred to as 'start time difference') determines whether the cipher parameters need to be corrected based on the start time difference, and corrects the cipher parameters if necessary. Note that the controller 33 does not determine whether a response message is retransmitted, but determines whether the cipher parameters need to be corrected.

More specifically, when the difference between the processing time and the actual start time is greater than or equal to a single CFN cycle of 256 frames, the controller 33 determines that the start time difference is greater than or equal to a single CFN cycle. When the difference between the processing time and the actual start time is less than 256 frames, the difference between the requested start time and the actual start time is zero CFN cycles. Therefore, the controller 33 determines that there is no difference between the requested start time and the actual start time.

In addition, in the case where the difference between the processing time and the actual start time is within the range of 256 frames or greater and less than 512 frames, and is at least a single CFN cycle of 256 frames and less than two CFN cycles, the controller 33 calculates that the start time difference is a single CFN cycle. Furthermore, if the difference between the processing time and the actual start time is within the range of 512 frames or greater and less than 768 frames, and is at least two times 256 frames and less than three times 256 frames, the controller 33 determines that the start time difference is two CFN cycles.

As described above, the controller 33 calculates the start time difference per CFN cycle in each of which HFN as cipher parameters change. In addition, the controller 33 calculates the start time difference based on how many multiples of a single CFN cycle of 256 frames the difference between the processing time and the actual start time is. In the case of FIG. 4, difference between the processing time 'n2' and the actual start time 'n6' is within the range of at least 256 frames and less than two times 256 frames. Therefore, the controller 33 determines that the difference in start time is a single CFN cycle.

In the case where the processing time is set to 'n2', both the mobile station 10 and the radio network controller 30 can change physical channel settings at the actual time 'n2'. In this case, the mobile station 10 and the radio network controller 30 can share the same actual time 'n2'. Therefore, there is no chance for a request message (RADIO BEARER SETUP) 1 to reach the mobile station 10 at a time deviating from the actual time 'n2'. Therefore, the controller 33 may measure the difference between the processing time 'n2' and the actual start time 'n6'.

The controller 33 determines whether the cipher parameters need to be corrected using the calculated start time difference, and then corrects the cipher parameters if necessary. The controller 33 generates HFN 'A' by attaching the lower 4 bits of '0' to the upper 20 bits of the HFN as the cipher parameter included in the response message notified from the mobile station 10 as shown FIG. 4. In addition, when a single CFN cycle has elapsed, the HFN is incremented by '1'.

Therefore, if the calculated start time difference is a single CFN cycle as shown in FIG. 4, the controller 33 determines that the cipher parameters need to be corrected, and adds '1' to the generated HFN 'A'. In this manner, the controller 33 corrects the HFN 'A' to HFN 'A+1'. If the calculated start time difference is two CFN cycles, the controller 33 adds '2' to the generated HFN 'A' for correcting the HFN 'A' to HFN 'A+2'. In this manner, the controller 33 adds the start time difference represented by a unit of a CFN cycle to the HFN generated from a part of the HFN notified from the mobile station 10.

The controller 33 instructs the mobile station signal terminator 34 and the data processing unit 35 to carry out a cipher process using the corrected cipher parameter HFN 'A+1' at the actual start time 'n6', which corresponds to the CFN 'a' notified from the mobile station 10. Cipher parameters and an actual start time are called related cipher information.

The instructed mobile station signal terminator 34 and the instructed data processing unit 35 generate a frame number (COUNT-C) using the HFN 'A+1', and start carrying out a cipher process or start modifying and carrying out the cipher process at the actual time 'n6', which corresponds to the CFN 'a'.

If there is no difference between the requested start time and the actual start time, the controller 33 determines that the cipher parameters need not be corrected, uses the HFN generated from the cipher parameter notified from the mobile station 10, and then instructs to carry out a cipher process at the actual start time, which is equal to the requested start time. For example, in the case where no retransmission is made or where even though retransmission has been made, that retransmission has succeeded by the actual time 'n3', since no start time difference develops between the receiver and the transmitter, the cipher parameters need not be corrected.

Alternatively, the controller 33 may determine how many times the requested start time has elapsed at the reception time at which the receiver/transmitter 31 has received a response message (notification), decide the actual start time based on the elapsed time count, and then correct the cipher parameter using the determined actual start time and the elapsed time count.

More specifically, the controller 33 sets, as a tentative actual start time, an actual time 'n6' when the CFN reaches the requested start time 'a', which is represented by the CFN in the response message, for the first time after the actual reception time 'n4'. The controller 33 then measures the difference between the processing time 'n2' and the tentative actual start time 'n6' as with the case of measuring difference between the processing time and the actual start time. The controller 33 calculates the difference between the requested start time and the tentative actual start time (hereafter, referred to as 'tentative start time difference') in accordance with how many multiples of a single CFN cycle of 256 frames the difference between the processing time and the tentative actual start time, as with the case of calculating the start time difference. In the case of FIG. 4, the controller 33 determines that the tentative start time difference is a single CFN cycle.

The controller 33 determines based on the calculated tentative start time difference how many times the requested start time represented by the CFN has elapsed (hereafter, referred to as 'elapsed time count') at the reception time at which a retransmitted response message has been received. As shown in FIG. 4, the controller 33 determines that the elapsed time count is one in the case where the tentative start time difference is a single CFN cycle, the elapsed time count is two in the case where the tentative start time difference is two CFN cycles, and the elapsed time count is zero in the case where the tentative start time difference is zero CFN cycles.

The controller 33 then determines the actual start time based on the elapsed time count. The controller 33 decides the actual start time based on the reception time in the case of the elapsed time count being one or greater and the requested start time having elapsed. In the case of FIG. 4, the elapsed time count is one, and the reception time is the actual time 'n4', which corresponds to the CFN 'a+2'.

Therefore, the controller 33 decides to use the actual time 'n4' corresponding to the CFN 'a+2', which is a reception time, as an actual start time, and also use the actual time 'n5' corresponding to the CFN 'a+3' immediately after that reception time as an actual start time. When the requested start time has elapsed, the mobile station 10, which sets cipher parameters and requested start times, is capable of starting a cipher process anytime. At this time, the controller 33 is capable of immediately starting the cipher process without waiting until the actual time 'n6' at which the CFN reaches 'a' for the first time after the reception time 'n4', by determining the actual start time based on the reception time.

On the other hand, if the elapsed time count is zero, the controller 33 then decides to use as the actual start time, the requested start time, which is set as a tentative actual start time.

In addition, the controller 33 determines whether the cipher parameters need to be corrected based on the elapsed time count and the CFN at the decided actual start time, and then corrects the cipher parameters if necessary. When the elapsed time count is one and the CFN at the actual start time is within the range of greater than the CFN at the requested start time and 255 or less, the HFN has a value before being incremented by '1'. Therefore, the controller 33 determines that the HFN generated from a part of the HFN in the response message need not be corrected, and thus correction is not made.

In the case of FIG. 4, since the CFN at the actual start time is 'a+2' or 'a+3', which is within the range of greater than the CFN 'a' at the requested start time and 255 or less, the controller 33 keeps 'A' generated from a part of the HFN included in a response message, i.e., the correction thereof is not carried out.

On the other hand, when the elapsed time count is one and the CFN at the actual start time is between 0 and the requested start time, the HFN has been incremented by '1'. Therefore, the controller 33 determines that the HFN needs to be corrected, and adds '2' to 'A' generated from a part of the HFN included in the response message, for correcting the HFN 'A' to HFN 'A+1'.

In addition, when the elapsed time count is two, the HFN has been incremented by at least '1'. In this case, when the CFN at the actual start time is within the range of greater than the CFN at the requested start time and 255 or less, the HFN has a value before being incremented by 1. Therefore, the controller 33 only adds '1', which is based on the elapsed time count, to the HFN 'A' generated from a part of the HFN included in the response message, for correcting the HFN 'A' to HFN 'A+1'.

On the other hand, when the CFN at the actual start time is between 0 and the requested start time, the HFN has been further incremented by '1'. Therefore, the controller 33 adds '2', which is based on the elapsed time count and the actual start time, to the HFN 'A' generated from a part of the HFN included in the response message, for correcting the HFN 'A' to HFN 'A+2'.

The controller 33 inputs related cipher information to the mobile station signal terminator 34 and the data processing unit 35 to instruct them to carry out a cipher process. In the case of FIG. 4, the controller 33 uses the HFN 'A' generated from the notified cipher parameters, and instructs the mobile station signal terminator 34 and the data processing unit 35 to carry out a cipher process at either the actual time 'n4' or 'n5' corresponding to the respective CFN 'a+2' and 'a+3' decided based on the reception time.

Note that when the elapsed time count is found to be zero, the controller 33 determines that the cipher parameters need not be corrected, and instructs to carry out a cipher process using the HFN generated from the cipher parameters notified from the mobile station 10.

In addition, it is unnecessary for the controller 33 to explicitly instruct the processing time to the mobile station 10. In this case, it may be previously decided between the radio network controller 30 and the mobile station 10 that the mobile station 10 starts the transmission of the response message (RADIO BEARER SETUP COMPLETE) 2 immediately after receiving the request message (RADIO BEARER SETUP) 1. Therefore, when the controller 33 does not explicitly instruct, the controller 33 can measure the difference between the transmission time at which a request message (RADIO BEARER SETUP) 1 is transmitted and the actual start time or the difference between the transmission time and the tentative actual start time, instead of the difference between the processing time and the actual start time or the difference between the processing time and the tentative actual start time.

In FIG. 4, the request message (RADIO BEARER SETUP) 1 is transmitted at an actual time 'n1'. Therefore, the controller 33 can measure the difference between the transmission time 'n1' and the actual start time or the difference between the transmission time 'n1' and the tentative actual start time 'n6' by activating the timer 33a at the transmission time 'n1'.

The controller 33 then calculates the start time difference and the tentative start time difference based on how many multiples of a single CFN cycle of 256 frames the difference between the transmission time and the actual start time or the difference between the transmission time and the tentative actual start time. In the case of FIG. 4, each of the difference between the transmission time 'n1' and the actual start time and difference between the transmission time 'n1' and the tentative actual start time 'n6' is within the range of at least 256 frames and less than twice 256 frames. Therefore, the controller 33 calculates that each of the start time difference and the tentative actual start time difference is a single CFN cycle.

Furthermore, it is preferable that the controller 33 considers the time for processing at the mobile station 10 and the time for transmission between the mobile station 10 and the radio network controller 30 when calculating the start time difference or the tentative start time difference. More specifically, the controller 33 calculates the start time difference or the tentative start time difference by subtracting the time for processing in the mobile station 10 or the time for transmission between the mobile station 10 and the radio network controller 30 from the difference between the processing time and the actual start time, the difference between the processing time and the tentative actual start time, the difference between the transmission time and the actual start time, and the difference between the transmission time and the tentative actual start time.

A predicted worst value may be used as a default value of the time for processing and time for transmission in order to subtract. In this manner, consideration of the time for processing and transmission certainly further prevents the ciphering shift.

As described above, if the controller 33 has determined that the reception time exceeds the requested start time due to retransmission of a response message (notification) being made multiple times, it then corrects the cipher parameters. In this manner, the controller 33 serves as a correction unit, which determines whether the cipher parameters need to be corrected in response to retransmission of the response message based on the requested start time received by the receiver/transmitter 31 and the actual start time, and then corrects the cipher parameters if necessary.

(Second Communication Control Method)

According to a second communication control method, the radio network controller 30 in which cipher parameters and requested start times are set up discards a response message, which needs to be discarded because of a possibility that multiple retransmission of the response message (notification) may result in a ciphering shift.

The controller 33 in the radio network controller 30 determines whether a response message (notification) needs to be discarded based on the reception time at which the receiver/transmitter 31 has received a response message and the requested start time, and then discards the response message if necessary. Note that the controller 33 does not determine whether a response message is retransmitted, but determines whether it needs to be discarded.

The controller 33 instructs the processing time 'n2' to the mobile station 10 and measures the elapsed time from the processing time 'n2' as with the first communication control method. When the reception time reaches an actual time 'n4' after the mobile station 10 has retransmitted a response message multiple times, the controller 33 decides, as an actual start time, the actual time 'n6' at which the CFN reaches 'a' for the first time after the actual reception time 'n4'.

The controller 33 then measures the difference between the processing time 'n2' and the actual start time 'n6'. Alternatively, the controller 33 can measure the difference between the transmission time 'n1' and the actual start time 'n6' as with the first communication control method.

The controller 33 determines whether the response message needs to be discarded by determining whether the requested start time has elapsed at the reception time, and if yes, then discards the retransmitted response message.

More specifically, when the difference between the processing time and the actual start time or difference between the transmission time and the actual start time is a fixed time, for example, a single CFN cycle of 256 frames or greater, as shown in FIG. 4, the controller 33 determines that the requested start time has elapsed at the reception time. When the difference between the processing time and the actual start time or difference between the transmission time and the actual start time is less than 256 frames, the controller 33 determines that the requested start time has not been reached at the reception time.

Note that if the radio network controller 30 does not explicitly instruct the processing time, the radio network controller 30 can not identify the transmission start time at which the mobile station 10 has started response message transmission because the response message may be retransmitted. However, since the CFN value set in the response message is under 256 frames, the controller 33 can determine the possibility of the requested start time having been elapsed at the reception time based on whether the difference between the transmission time and the actual start time is either 256 frames or greater or less than 256 frames.

In addition, it is preferable that the controller 33 can consider the time for processing in the mobile station 10 and the time for transmission between the mobile station 10 and the radio network controller 30 when calculating the difference between the processing time and the actual start time or difference between the transmission time and the actual start time as with the case of the first communication control method.

When the controller 33 has determined that the requested start time has elapsed at the reception time, it then determines that the response message needs to be discarded, and discards the received response message (RADIO BEARER SETUP COMPLETE) 2.

The controller 33 may generate and input the request message (RADIO BEARER SETUP) to the receiver/transmitter 31 again. This allows additional transmission of a request message from the radio network controller 30 to the mobile station 10. The mobile station 10 sets a new cipher parameter and a requested start time in response to the additional request message, and then transmits the response message. This allows establishment of the new cipher parameter and the requested start time to be shared by the mobile station 10 and the radio network controller 30.

When the controller 33 has determined that the requested start time has not been reached at the reception time, it then determines that the response message needs not be discarded, and instructs the mobile station signal terminator 34 and the data processing unit 35 to carry out a cipher process at the actual start time, which is equal to the requested start time, using the HFN generated from the cipher parameter notified from the mobile station 10.

As described above, the controller 33 serves as a discard unit, which determines whether the response message needs to be discarded due to multiple retransmission of the response message, based on the reception time at which the receiver/transmitter 31 has received the response message (notification) and the requested start time and if yes, then discards the response message.

(Third Communication Control Method)

According to a third communication control method, the mobile station 10, which sets cipher parameters and requested start times, terminates retransmission of a response message which may cause a ciphering shift due to multiple retransmissions thereof. When the receiver/transmitter 12 has failed to transmit a response message (notification), the controller 13 in the mobile station 10 then controls the receiver/transmitter 12 to retransmit a response message based on the response message retransmission time and the requested start time.

The controller 13 decides the requested start time considering the possibility that the response message may arrive at the radio network controller 30 late due to retransmission or the like. In FIG. 4, the controller 13 decides as a requested start time, the CFN 'a' corresponding to the actual time 'n3' after 'X' has elapsed from the actual processing time 'n2'.

The controller 13 controls the receiver/transmitter 12 to transmit a response message. The controller 13 instructs the receiver/transmitter 12 to retransmit a response message when the receiver/transmitter 12 has failed to transmit the response message.

The controller 13 determines whether a response message (notification) would be received after the requested start time if retransmitting the response message at a retransmission time, and if yes, then terminates retransmission.

More specifically, at the point when the controller 13 determines that the response message has been received by the radio network controller 30 after the set requested start time, even if a response message is transmitted at a retransmission time, the controller 13 stops instructing retransmission. In the case of FIG. 4, the controller 13 stops instructing retransmission at the point when it has determined that the actual time 'n3' as the requested start time has elapsed. Note that the controller 13 repeatedly instructs retransmission until then.

In addition, the controller 13 may set cipher parameters and a requested start time again, and generate a new response message. The controller 13 inputs the generated response message to the receiver/transmitter 12. The mobile station 10 transmits the generated new response message, thereby setting new cipher parameters and a requested start time to be shared by the mobile station 10 and the radio network controller 30.

In this manner, when retransmitting a response message (notification), the controller 13 serves as a retransmission controller, which controls the receiver/transmitter 12 to retransmit a response message based on the response message retransmission time and the requested start time.

According to the mobile communication system 100, the radio network controller 30, and the first communication control method, when it is determined that the received cipher parameters need to be corrected due to the difference between the requested start time and the actual start time that develops after a response message (notification) has been retransmitted multiple times thereby taking a long time, the cipher parameters may be corrected based on the relationship between the requested start time and the actual start time. This allows prevention of a ciphering shift, which means that cipher parameters may differ between the mobile station 10 and the radio network controller 30, even in the case where a response message has been retransmitted multiple times resulting in the difference between the requested start time and the actual start time.

In addition, according to the mobile communication system 100, the radio network controller 30, and the second communication control method, a response message (notification) may successfully arrive after the requested start time due to the response message having been retransmitted multiple times. And if the radio network controller 30, which has received the response message, operates according to the requested start time and the cipher parameter notified from the mobile station 10, the actual start time differs from the requested start time. To solve this problem, notification needing to be discarded can be discarded. In other words, a retransmitted response message that causes the cipher parameters to differ between the mobile station 10 and the radio network controller 30 can be discarded and disabled. This allows prevention of a cipher shift, which means that the cipher parameters for the mobile station 10 differs from those for the radio network controller 30 due to a response message having been retransmitted multiple times.

Furthermore, according to the mobile communication system 100, the mobile station 10, and the third communication control method, even if a response message is retransmitted at a retransmission time after a response message has been retransmitted multiple times thereby taking a long time, since the radio network controller 30 successfully receives the retransmitted response messages after the requested start time, difference between the requested start time and the actual start time develops when the radio network controller 30 operates according to the notified cipher parameters and the requested start time. To solve this problem, retransmission of a response message causing cipher parameter difference between the mobile station 10 and the radio network controller 30 to develop is stopped and disabled.

In other words, the radio network controller 30 cannot erroneously recognize the cipher parameters and the requested start time set by the mobile station 10. This allows prevention of a cipher shift, which means that the cipher parameters of the mobile station 10 differs from those of the radio network controller 30 due to a response message having been transmitted multiple times.

As described above, according to the above-described mobile communication system 100, the mobile station 10, the radio network controller 30, and the first through third communication control methods, the mobile station 10 and the radio network controller 30 can receive/transmit data without developing a cipher shift even if notification of cipher parameters and a requested start time is retransmitted multiple times, thereby preventing erroneous data. In other words, even when transmission of a response message is repeated multiple times under layer 2 retransmission control, a requested start time of the transmitter cannot be erroneously interpreted by the receiver.

(Modification)

Note that the present invention is not limited to the above-described embodiments, and various modifications thereof are possible. For example, the mobile station 10 may be set cipher parameters and requested start times, while the radio network controller 30 may set those cipher parameters and requested start times.

In this case, the controller 13 in the mobile station 10 carries out the same initial process as the controller 33 in the radio network controller 30. In addition, the controller 33 in the radio network controller 30 carries out the same initial process as the controller 13 in the mobile station 10. Furthermore, the present invention may be use for not only the mobile station 10 and the radio network controller 30, but also for communication devices, which set cipher parameters and requested start times and carry out a cipher process.

Furthermore, in the case where controller 33 does not explicitly instruct, it may be previously decided between the radio network controller 30 and mobile station 10 that the mobile station 10 starts the transmission of the response message immediately after receiving a request message (RADIO BEARE SETUP) 1. Therefore, it is described above that the controller 30 can measure the difference between the transmission time of the request message 1 and the actual start time or the difference between the transmission time and the tentative actual start time.

Figure 6:
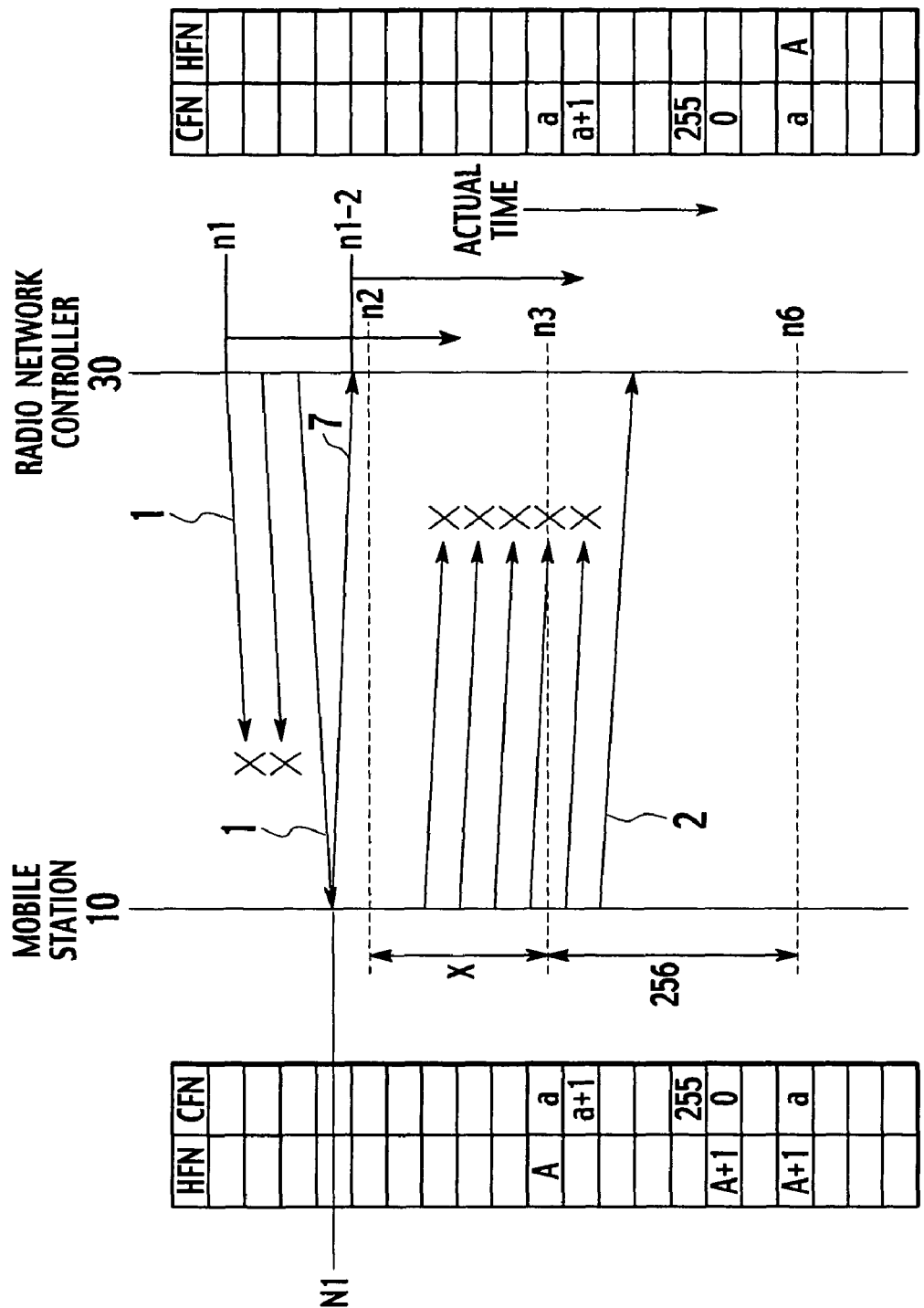
FIG. 6 shows an initial process according to a modification of the present invention (a timer is reactivated).

For example, the controller 33 can measure the difference between the transmission time 'n1' of the request message 1 and the actual start time or the tentative actual start time 'n6' by activating the timer 33a at the transmission time 'n1' of the request message 1, as shown in FIGS. 4 and 6. In this case, the radio network controller 30 fails the transmission of the request message 1 and retransmits the request message 1, as shown FIG. 6. If the request message 1 is retransmitted multiple times, it results in the interval between the transmission time 'n1' of the request message 1 and the processing time 'n2' at which the mobile station 10 actually starts the transmission process of the response message 2 being long.

Therefore, there is fear that the radio network controller 30 may not accurately calculate the start time difference or the tentative actual start time or the radio network controller 30 may not accurately determine whether the requested start time has elapsed at the reception time.

To solve this problem, the controller 33 can reactivate the timer 33a at the actual time 'n1-2' at which the receiver/transmitter 31 has received an Acknowledge 7 transmitted by the mobile station 10 according to the reception of the request message 1. The Acknowledge 7 means that the mobile station 10 has received the request message 1 normally.

The actual time 'n1-2' at which the transmitter/receiver 31 receives the Acknowledge 7 is almost equal to the actual time 'N1' at which the mobile station 10 receives the request message 1. Therefore, the controller 33 can measure the difference between the actual time 'n1-2' which is almost equal to the actual time 'N1', which is closer to the processing time 'n2' of starting the transmission process of the response message 2 by the mobile station 10 and the actual start time or the tentative actual start time. Therefore, the radio network controller 30 can calculate the start time difference or tentative start time difference more accurately. Or the radio network controller 30 can determine whether the requested start time has elapsed at the reception time more accurately. Note that the retransmission of the Acknowledge 7 is performed by layer 2.

In addition, the mobile station 10 can retransmit the Acknowledge 7 due to the failure of the transmission of the Acknowledge 7 as shown in FIG. 7. In this case, there is fear that the actual time 'n2-1' at which the transmitter/receiver 31 receives the Acknowledge 7 elapses the processing time 'n2' at which the mobile station 10 actually starts the transmission process of the response message 2. In this case, if the controller 33 reactivates the timer 33a, it is possible that the radio network controller 30 may not accurately calculate the start time difference or the actual start time or the radio network controller 30 may not accurately determine whether the requested start time has elapsed at the reception time.

Therefore, the controller 33 can determine whether the Acknowledge 7 is retransmitted. The controller 33 can measure the difference between the reception time of the Acknowledge 7 and the actual start time or the difference between the reception time of the Acknowledge 7 and the tentative actual start time, when the Acknowledge 7 is not retransmitted. In other words, the controller 33 may reactivate the timer 33a, when the Acknowledge 7 is not retransmitted. On the other hand, the controller 33 may not reactivate the timer 33a, when the Acknowledge 7 is retransmitted.

The radio network controller 33 and the mobile station 10 can previously decide that the physical channel can be changed after the mobile station 10 receives the request message land transmits the Acknowledge 7 first. In this case, the mobile station 10 transmits the first Acknowledge 7 through the physical channel, which has not changed yet. On the other hand, the mobile station 10 transmits the retransmitted Acknowledge 7 through the physical channel, which has changed.

Therefore, in this case, the controller 33 can determine that the Acknowledge 7 is not retransmitted when the receiver/transmitter 31 receives the Acknowledge 7 through the physical channel, which has not changed yet, i.e., the same physical channel, which is used so far shown in FIG. 6, and then reactivate the timer 33a. On the other hand, the controller 33 can determine that the Acknowledge 7 is retransmitted when the receiver/transmitter 31 receives the Acknowledge 7 through the physical channel, which has changed, i.e., the physical channel, which is not used so far shown in FIG. 7. In this case, the controller 33 does not reactivate the timer 33a.

In this manner, the radio network controller 30 can change the measurement start time by reactivating the timer 33a appropriately. Therefore, the controller 30 can appropriately improvement the accuracy of the calculation of the start time difference and the tentative start time difference and the accuracy of the determination that whether the requested start time has elapsed at the reception time.

What is claimed is:

1. A communication device, comprising:
 a receiver configured to receive a notification of a cipher parameter used for encryption of data and a requested start time for starting encryption; and
 a correction unit configured to determine whether the cipher parameter needs correction based on how many times the requested start time is cycled between a first actual time and a second actual time, and to correct the cipher parameter when the correction unit determines that that the requested start time is cycled between the first actual time and the second actual time one or more times,
 wherein the first actual time is an actual time when the cipher parameter and the requested start time is requested to be set, and the second actual time is an actual time when the requested start time is reached for the first time after the notification is received by the receiver.

2. The communication device of claim 1, wherein the correction unit is configured to start the encryption at the second actual time.

3. The communication device of claim 1, wherein the correction unit is configured to start the encryption at the second actual time when the requested start time is not cycled between the first actual time and the second actual time, and to start the encryption without waiting until the second actual time when the requested time is cycled between the first actual time and the second actual time.

4. A communication device, comprising:
 a receiver configured to receive a notification of a cipher parameter used for encryption of data and a requested start time for starting encryption; and
 a discard unit configured to determine whether the notification needs to be discarded based on how many times the requested start time is cycled between a first actual time and a second actual time, and to discard the notification when the discard unit determines that that the requested start time is cycled between the first actual time and the second actual time one or more times,
 wherein the first actual time is an actual time when the cipher parameter and the requested start time is requested to be set, and the second actual time is an actual time when the requested start time is reached for the first time after the notification is received by the receiver.

5. A communication control method, comprising:
 receiving a notification of a cipher parameter used for encryption of data and a requested start time for starting encryption;
 determining whether the cipher parameter needs correction based on how many times the requested start time is cycled between a first actual time and a second actual time; and
 correcting the cipher parameter,
 wherein the first actual time is an actual time when the cipher parameter and the requested start time is requested to be set, and the second actual time is an actual time when the requested start time is reached for the first time after the notification is received by the receiver, and
 the determining includes determining that that the requested start time is cycled between the first actual time and the second actual time one or more times, and the correcting includes correcting the cipher parameter based on the determination that the requested start time is cycled between the first actual time and the second actual time one or more times.

6. A communication control method, comprising:
 receiving a notification of a cipher parameter used for encryption of data and a requested start time for starting encryption;
 determining whether the notification needs to be discarded based on how many times the requested start time is cycled between a first actual time and a second actual time; and
 discarding the notification,
 wherein the first actual time is an actual time when the cipher parameter and the requested start time is requested to be set, and the second actual time is an actual time when the requested start time is reached for the first time after the notification is received by the receiver, and
 the determining includes determining that that the requested start time is cycled between the first actual time and the second actual time one or more times, and the discarding includes discarding the notification based on the determination that the requested start time is cycled between the first actual time and the second actual time one or more times.

7. The communication device of claim 1, wherein the first actual time is an actual time instructed by a request message for requesting to set the cipher parameter and the requested start time.

8. The communication device of claim 1, wherein the first actual time is an actual time when the communication device transmits a request message for requesting to set the cipher parameter and the requested start time.

9. The communication device of claim 4, wherein the first actual time is an actual time instructed by a request message for requesting to set the cipher parameter and the requested start time.

10. The communication device of claim 4, wherein the first actual time is an actual time when the communication device transmits a request message for requesting to set the cipher parameter and the requested start time.

11. A communication device, comprising:
- a receiver configured to receive a notification of a cipher parameter used for encryption of data and a requested start time for starting encryption; and
- a correction unit configured to determine whether the cipher parameter needs correction based on how many times the requested start time is cycled between a first actual time and a second actual time, and to correct the cipher parameter,
- wherein the first actual time is an actual time when the cipher parameter and the requested start time is requested to be set, and the second actual time is an actual time when the requested start time is reached for the first time after the notification is received by the receiver, and
- the correction unit is configured to correct the cipher parameter by adding, to the cipher parameter, a number corresponding to how many times the requested start time is cycled between the first actual time and the second actual time.

12. A communication control method, comprising:
- receiving a notification of a cipher parameter used for encryption of data and a requested start time for starting encryption;
- determining whether the cipher parameter needs correction based on how many times the requested start time is cycled between a first actual time and a second actual time; and
- correcting the cipher parameter,
- wherein the first actual time is an actual time when the cipher parameter and the requested start time is requested to be set, and the second actual time is an actual time when the requested start time is reached for the first time after the notification is received by the receiver, and
- the correcting includes correcting the cipher parameter by adding, to the cipher parameter, a number corresponding to how many times the requested start time is cycled between the first actual time and the second actual time.

* * * * *